United States Patent
Vobbilisetty et al.

(10) Patent No.: US 9,602,430 B2
(45) Date of Patent: Mar. 21, 2017

(54) GLOBAL VLANS FOR FABRIC SWITCHES

(71) Applicant: BROCADE COMMUNICATIONS SYSTEMS, INC., San Jose, CA (US)

(72) Inventors: Suresh Vobbilisetty, San Jose, CA (US); Phanidhar Koganti, Hyderabad (IN); Chi Lung Chong, Fremont, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 671 days.

(21) Appl. No.: 13/971,397

(22) Filed: Aug. 20, 2013

(65) Prior Publication Data

US 2014/0056298 A1   Feb. 27, 2014

Related U.S. Application Data

(60) Provisional application No. 61/691,723, filed on Aug. 21, 2012.

(51) Int. Cl.
*H04L 12/933* (2013.01)
*H04L 12/46* (2006.01)
*H04L 12/931* (2013.01)

(52) U.S. Cl.
CPC .............. *H04L 49/10* (2013.01); *H04L 12/46* (2013.01); *H04L 12/4641* (2013.01); *H04L 49/354* (2013.01); *H04L 49/65* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 829,529 | A | 8/1906 | Keathley |
| 5,390,173 | A | 2/1995 | Spinney |
| 5,802,278 | A | 9/1998 | Isfeld |
| 5,878,232 | A | 3/1999 | Marimuthu |
| 5,959,968 | A | 9/1999 | Chin |
| 5,973,278 | A | 10/1999 | Wehrill, III |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

Touch, J. et al., 'Transparent Interconnection of Lots of Links (TRILL): Problem and Applicability Statement', May 2009, Network Working Group, pp. 1-17.

(Continued)

*Primary Examiner* — Adnan Baig
(74) *Attorney, Agent, or Firm* — Shun Yao; Park, Vaughan, Fleming & Dowler LLP

(57) ABSTRACT

One embodiment of the present invention provides a switch. The switch includes a virtual local area network (VLAN) configuration module. During operation, the VLAN configuration module maps local resources of the switch and/or locally coupled end device information to a global VLAN identifier, wherein the global VLAN is persistent across a fabric switch. The fabric switch is operable to accommodate a plurality of switches and operates as a single logical switch.

36 Claims, 10 Drawing Sheets

(56) References Cited

U.S. PATENT DOCUMENTS

| | | |
|---|---|---|
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 | 11/2003 | Laing |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |

(56) References Cited

U.S. PATENT DOCUMENTS

| | | |
|---|---|---|
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1* | 12/2006 | Cho ............... H04L 12/4641 370/397 |
| 2007/0036178 A1 | 2/2007 | Hares |
| 2007/0053294 A1 | 3/2007 | Ho |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0220724 A1 | 9/2010 | Rabie |
| 2010/0226381 A1 | 9/2010 | Mehta |
| 2010/0246388 A1 | 9/2010 | Gupta |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |

(56) References Cited

U.S. PATENT DOCUMENTS

| | | |
|---|---|---|
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | En |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0243539 A1 | 9/2012 | Keesara |
| 2012/0275297 A1 | 11/2012 | Subramanian |
| 2012/0275347 A1 | 11/2012 | Banerjee |
| 2012/0278804 A1* | 11/2012 | Narayanasamy ... G06F 9/45558 718/1 |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1* | 2/2013 | Jaiswal ............... H04L 12/4641 370/254 |
| 2013/0034021 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0294451 A1 | 11/2013 | Li |
| 2013/0301642 A1 | 11/2013 | Radhakrishnan |
| 2013/0308647 A1* | 11/2013 | Rosset ................ H04L 12/4641 370/395.53 |
| 2013/0346583 A1 | 12/2013 | Low |
| 2014/0013324 A1* | 1/2014 | Zhang ..................... H04L 49/70 718/1 |
| 2014/0025736 A1 | 1/2014 | Wang |
| 2014/0044126 A1 | 2/2014 | Sabhanatarajan |
| 2014/0056298 A1 | 2/2014 | Vobbilisetty |
| 2014/0105034 A1 | 4/2014 | Sun |
| 2015/0010007 A1 | 1/2015 | Matsuhira |
| 2015/0030031 A1 | 1/2015 | Zhou |
| 2015/0143369 A1 | 5/2015 | Zheng |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 12/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Zhai F. Hu et al. 'RBridge: Pseudo-Nickname; draft-hu-trill-pseudonode-nickname-02.txt', May 15, 2012.

Office Action dated Sep. 17. 2015, U.S. Appl. No. 14/577,785, filed Dec. 19, 2014.

Narten, T. et al. "Problem Statement: Overlays for Network Virtualization draft-narten-nvo3-overlay-problem statement-01", Oct. 31, 2011.

Knight, Paul et al. "Layer 2 and 3 Virtual Private Networks: Taxonomy, Technology, and Standardization Efforts", 2004.

An Introduction to Brocade VCS Fabric Technology, Dec. 3, 2012.

Kreeger, L. et al. "Network Virtualization Overlay Control Protocol Requirements draft-kreeger-nvo3-overlay-cp-00", Aug. 2, 2012.

Knight, Paul et al., "Network based IP VPN Architecture using Virtual Routers", May 2003.

Louati, Wajdi et al., "Network-Based Virtual Personal Overlay Networks Using Programmable Virtual Routers", 2005.

Brocade Unveils "The Effortless Network", 2009.

The Effortless Network: HyperEdge Technology for the Campus LAN, 2012.

Foundry FastIron Configuration Guide, Software Release FSX 04.2.00b, Software Release FWS 04.3.00, Software Release FGS 05.0.00a, 2008.

FastIron and TurboIron 24x Configuration Guide, 2010.

FastIron Configuration Guide, Supporting IronWare Software Release 07.0.00, 2009.

Christensen, M. et al., Considerations for Internet Group Management Protocol (IGMP) and Multicast Listener Discovery (MLD) Snooping Switches, 2006.

Perlman, Radia et al. "RBridges: Base Protocol Specification", <draft-ietf-trill-rbridge-protocol-16.txt>, 2010.

Brocade Fabric OS (FOS) 6.2 Virtual Fabrics Feature Frequently Asked Questions, 2009.

(56) References Cited

OTHER PUBLICATIONS

Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications Sep. 23, 1994, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated Dec. 5, 2012.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 13/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/902,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Oct. 26, 2012, dated Oct. 26, 2012.
Office Action for U.S. Appl. No. 13/050,102, filed May 16, 2013, date May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Jul. 18, 2013, dated Jul. 18, 2013.
Office Action for U.S. Appl. No. 13/312,903, filed Dec. 6, 2011, dated Jun. 13, 2013.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.

(56) References Cited

OTHER PUBLICATIONS

Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
Brocade 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/365,993, filed Feb. 3, 2012, from Cho, Hong Sol., dated Jul. 23, 2013.
Office Action for U.S. Appl. No. 12/950,974, filed Nov. 19, 2010, dated Dec. 20, 2012.
Office Action for U.S. Appl. No. 13/092,877, filed Apr. 22, 2011, dated Sep. 5, 2013.
Office Action for U.S. Appl. No. 13/092,887 dated Jan. 6, 2014.
Office Action for U.S. Appl. No. 13/098,490, filed May 2, 2011, dated Mar. 27, 2014.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.

(56) References Cited

OTHER PUBLICATIONS

Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.

* cited by examiner

GLOBAL VLANS FOR FABRIC SWITCHES

RELATED APPLICATIONS

This application claims the benefit of U.S. Provisional Application No. 61/691,723, titled "Global VLANs for Fabric Switch," by inventors Suresh Vobbilisetty, Phanidhar Koganti, and Chi Chong, filed 21 Aug. 2012, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and to U.S. patent application Ser. No. 13/092,752, titled "Name Services for Virtual Cluster Switching," by inventors Suresh Vobbilisetty, Phanidhar Koganti, and Jesse B. Willeke, filed 22 Apr. 2011, the disclosures of which are incorporated by reference herein.

BACKGROUND

Field

This disclosure relates to computer networking. More specifically, this disclosure relates to systems and techniques for determining a virtualized network across multiple switches.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, network virtualization is becoming progressively more important as a value proposition for network architects. In addition, the evolution of virtual computing has make multi-tenancy attractive and, consequently, placed additional requirements on the network. For example, virtual servers are being allocated to a large number of tenants while a respective tenant operating multiple virtualized networks. It is often desirable that the network infrastructure can provide a large number virtualized network to support multi-tenancy and ensure network separation among the tenants.

While a fabric switch brings many desirable features to a network, some issues remain unsolved in facilitating a large number of virtualized networks across the fabric switch.

SUMMARY

One embodiment of the present invention provides a switch. The switch includes a virtual local area network (VLAN) configuration module. During operation, the VLAN configuration module maps local resources of the switch and/or locally coupled end device information to a global VLAN identifier, wherein the global VLAN identifier is persistent across a fabric switch. The fabric switch is operable to accommodate a plurality of switches and operates as a single logical switch.

In a variation on this embodiment, the mapping between a global VLAN and the local resources and/or locally coupled end device information is local to the switch.

In a variation on this embodiment, the global VLAN is mapped to one or more of: a local port, a media access control (MAC) address, an Institute of Electrical and Electronics Engineers (IEEE) 802.1Q Service VLAN (S-VLAN) identifier, an IEEE Customer VLAN (C-VLAN) identifier, and a Virtual Private Network (VPN) identifier.

In a variation on this embodiment, the switch also includes an internal identifier module which determines an internal identifier based on the local resources and/or locally coupled end device information. The VLAN configuration module then maps the internal identifier to the global VLAN identifier.

In a variation on this embodiment, the VLAN configuration module identifies the global VLAN identifier based on one or more fields in a packet.

In a variation on this embodiment, the VLAN configuration module maps a tenant of the switch to the global VLAN identifier.

In a variation on this embodiment, the global VLAN identifier is associated with an Internet Protocol (IP) subnetwork (subnet) with layer-3 routing support. The global VLAN identifier is then associated with a logical layer-3 interface.

In a further variation, the logical layer-3 interface is operable as a default gateway for locally coupled virtual machines. The logical layer-3 interface is associated with a virtual IP address and a virtual MAC address. The virtual IP address and the virtual MAC address are associated with a respective switch in the fabric switch.

In a further variation, the switch includes a routing module which creates a route between two subnets associated with two global VLAN identifiers without requiring a routing protocol. The switch also includes a forwarding module which determines an output port for a packet from a first of the two subnets to a second of the two subnets based on the route.

In a further variation, the switch also includes a separation module which maintains a virtual routing and forwarding separation comprising a subset of local routes. This virtual routing and forwarding separation is persistent across the fabric switch.

In a variation on this embodiment, the switch also includes a packet processor which adds a Transparent Interconnection of Lots of Links (TRILL) header to a packet. This TRILL header includes the global VLAN identifier.

In a variation on this embodiment, the global VLAN identifier is persistent across a plurality of fabric switches.

In a variation on this embodiment, the switch also includes a control module operable, which runs a control plane with automatic configuration capabilities based on a protocol associated with the fabric switch and forms a logical Ethernet switch based on the automatic configuration capabilities of the control plane. The control module also receives an automatically assigned identifier corresponding to the logical Ethernet switch without requiring manual configuration of the identifier and joins the fabric switch via the control plane.

BRIEF DESCRIPTION OF THE FIGURES

In the figures, like reference numerals refer to the same figure elements.

DETAILED DESCRIPTION

Figure 1A:
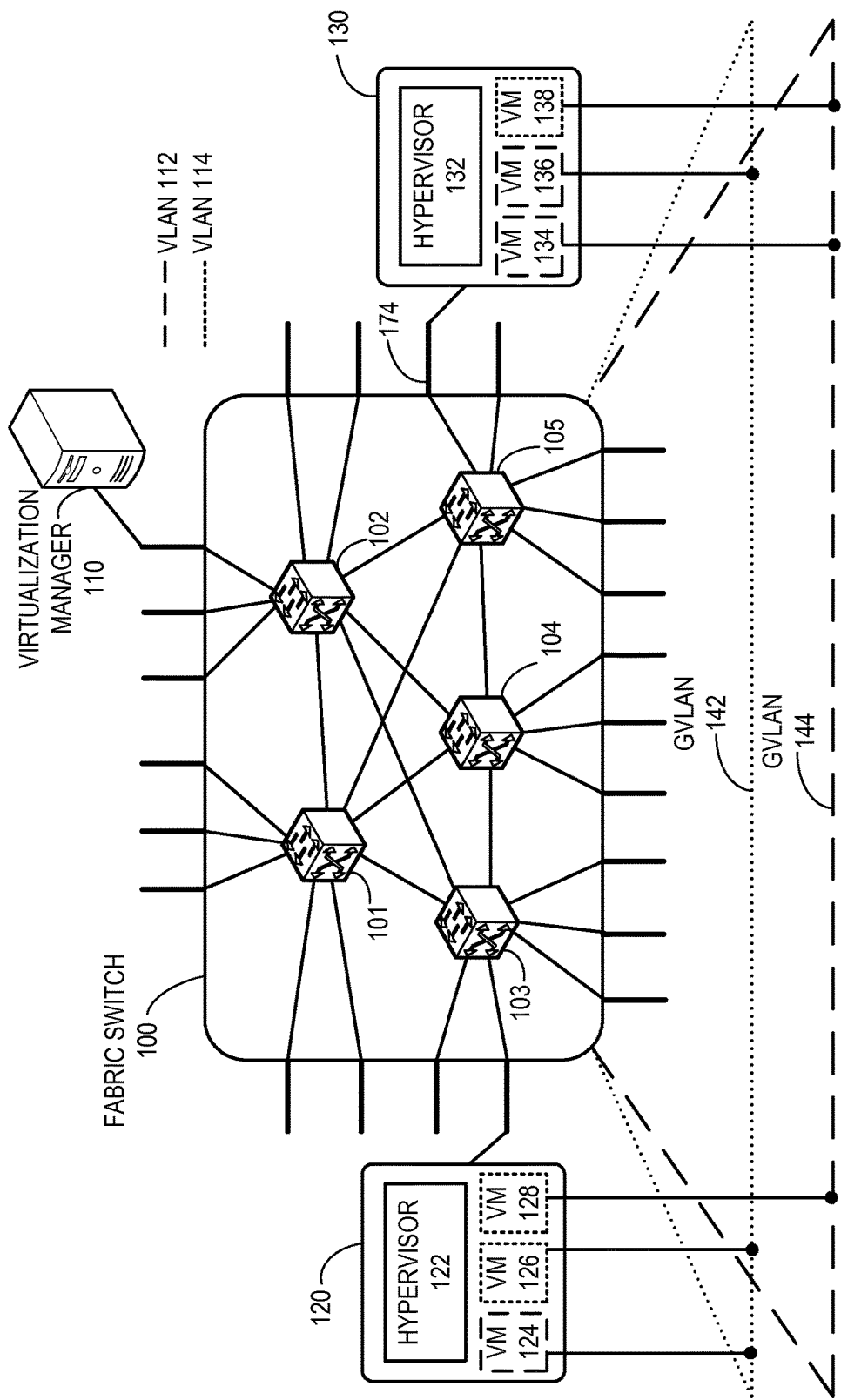
FIG. 1A illustrates an exemplary fabric switch with global VLAN support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing large-scale network virtualization in a fabric switch is solved by creating a global virtual local area network (VLAN) across the fabric switch while localizing Institute of Electrical and Electronics Engineers (IEEE) 802.1Q VLANs in a respective member switch. In network virtualization, a large and complex network infrastructure can be carved up into multiple virtual networks (e.g., a layer-2 VLAN) to facilitate manageability. Furthermore, the network infrastructure can serve a plurality of tenants, a respective of which may require a number of VLANs. Especially in a fabric switch (e.g., an Ethernet fabric switch), a respective member switch can serve a plurality of tenants while a plurality of member switches can serve the same tenant. As a result, a fabric switch requires a large number of VLANs which are consistent across the member switches of fabric switch. However, with existing technologies, the total number of VLANs is limited and can bound the number of VLANs the fabric switch can support for a respective tenant.

To solve this problem, member switches in a fabric switch, in conjunction with each other, facilitates a large number global virtualized layer-2 networks (e.g., global VLANs) across the fabric switch. A respective member switch can use local resources (e.g., a local port) and/or information regarding a respective end device (e.g., local server or virtual machine) to map the end device to a global VLAN. Examples of such end device information include, but are not limited to, a physical or virtual device identifier (e.g., a media access control (MAC) address), an IEEE 802.1Q Service VLAN (S-VLAN) identifier and/or Customer VLAN (C-VLAN) identifier, and a Virtual Private Network (VPN) identifier. For example, a member switch can locally associate the limited number of IEEE 802.1Q VLANs with local end devices based on the availability. The member switch further associates the end devices with global VLANs, which are consistent across the fabric switch, based on the local resources and/or end device information.

In other words, a global VLAN provides fabric-wide VLAN for end devices coupled to one or more member switches. However, the association with the global VLAN is local to a member switch. As a result, the same global VLAN can be mapped to two end devices based on two different sets information in two member switches. In this way, a fabric switch can associate end devices coupled to different member switches and associated with different 802.1Q VLANs with the same global VLAN, thereby facilitating a large number of fabric-wide virtualized layer-2 networks with localized association.

In some embodiments, a global VLAN can support Internet Protocol (IP) routing. A global VLAN then can be associated with an IP sub-network (subnet) and can operate as a logical layer-3 interface assigned with an IP address from the subnet in a respective member switch. A respective member switch can maintain a mapping between the global VLAN and the corresponding subnet. In some embodiments, the layer-3 interface operates as a default gateway for the corresponding global VLAN and is assigned a virtual IP address, which is consistent in a respective member switch. Because the layer-3 interface is associated with the same virtual IP address in a respective member switch, the layer-3 interface operates as a distributed layer-3 gateway.

In some embodiments, the fabric switch is an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to an external device. In some further embodiments, the fabric switch is a Transparent Interconnection of Lots of Links (TRILL) network and a respective member switch of the fabric switch is a TRILL routing bridge (RBridge).

Although the present disclosure is presented using examples based on the TRILL protocol, embodiments of the present invention are not limited to networks defined using TRILL, or a particular Open System Interconnection Reference Model (OSI reference model) layer. For example, embodiments of the present invention can also be applied to a multi-protocol label switching (MPLS) network. In this disclosure, the term "fabric switch" is used in a generic sense, and can refer to a network operating in any networking layer, sub-layer, or a combination of networking layers.

In this disclosure, the term "end device" can refer to a physical or virtual device coupled to a fabric switch. An end device can be a host, a server, a conventional layer-2 switch, a layer-3 router, or any other type of device. Additionally, an end device can be coupled to other switches or hosts further away from a network. An end device can also be an aggregation point for a number of network devices to enter the network. The terms "device" and "machine" are used interchangeably.

The term "hypervisor" is used in a generic sense, and can refer to any virtual machine manager. Any software, firmware, or hardware that creates and runs virtual machines can be a "hypervisor." The term "virtual machine" also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port in a fabric switch which exchanges data frames with an external device outside of the fabric switch. The term "inter-switch port" refers to a port which couples a member switch of a fabric switch with another member switch and is used for exchanging data frames between the member switches.

Network Architecture

FIG. 1A illustrates an exemplary fabric switch with global VLAN support, in accordance with an embodiment of the present invention. As illustrated in FIG. 1A, a fabric switch 100 includes member switches 101, 102, 103, 104, and 105. In some embodiments, one or more switches in fabric switch 100 can be virtual switches (e.g., a software switch running on a computing device). Switches 103 and 105 are coupled to host machines 120 and 130, respectively. Member switches in fabric switch 100 use edge ports to communicate to end devices and inter-switch ports to communicate to other member switches. For example, switch 103 is coupled to end devices, such as host machine 120, via edge ports and to switches 101, 102, and 104 via inter-switch ports. Host machines 120 and 130 include hypervisors 122 and 132, respectively. Virtual machines (VMs) 124, 126, and 128 run on hypervisor 122, and virtual machines 134, 136, and 138 run on hypervisor 132.

During operation, fabric switch 100 receives a mapping between local resources (e.g., a local port) and/or end device information, and a global VLAN. Examples of such information regarding an end device include, but are not limited to, a physical or virtual device identifier (e.g., a media access control (MAC) address), an IEEE 802.1Q Service VLAN (S-VLAN) identifier and/or Customer VLAN (C-VLAN) identifier, and a Virtual Private Network (VPN) identifier. In some embodiments, a network administrator provides the mapping to one of the member switches of fabric switch 100, which in turn, distributes the mapping to all other member switches based on an internal information distribution service of fabric switch 100.

In some embodiments, switch 102 receives end device information, such as the MAC address, of a respective virtual machine from a virtualization manager 110 coupled to switch 102. Examples of a virtualization manager include, but are not limited to, VMWare vCenter, Citrix XenCenter, and Microsoft Virtual Machine Manager. Upon receiving the end device information, switch 102 distributes the information to all other member switches based on an internal information distribution service of fabric switch 100. A respective member switch of fabric switch 100 includes a distributed service manager which manages global VLANs across fabric switch 100. Because allocation of IEEE 802.1Q VLAN is local to a member switch while global VLAN is fabric-wide, the service manager in a respective member switch determines IEEE 802.1Q VLAN allocation for local virtual machines based on local availability and policy. Fabric switch 100 then notifies virtualization manager 110 regarding the local VLAN allocation, which in turn associates the VLAN to the corresponding virtual machine.

For example, based on local availability and policy, the service manager in switch 105 determines that virtual machines 134 and 136 should be associated with VLAN 112 (denoted with dashed lines), and virtual machine 138 should be associated with VLAN 114 (denoted with dotted lines). Switch 105 notifies virtualization manager 110 via fabric switch 100 regarding this VLAN assignment information. Upon receiving this information, virtualization manager 110 associates VLANs 112 and 114 to the corresponding virtual machines. Similarly, based on information from switch 103, virtualization manager 110 associates virtual machine 124 with VLAN 112 and virtual machines 126 and 128 with VLAN 114.

Based on the received information and VLAN allocation, the service manager of a respective member switch identifies the virtual machines belonging to a layer-2 domain. For example, the service manager running on switches 103 and 105 individually determine that virtual machines 124, 126, and 136 belong to a layer-2 domain even though their local VLANs are different. Hence, the service manager associates virtual machines 124, 126, and 136 to global VLAN 142 and represents global VLAN 142 with an identifier. Similarly, the service manager associates virtual machines 128, 134, and 138 to global VLAN 144 and represents global VLAN 144 with an identifier. The distributed service manager in fabric switch 100 can generate a respective global VLAN identifier such a way that the same global VLAN identifier is generated in a respective member switch. In some embodiments, a respective member switch uses at least 20 bits to represent the identifiers of global VLANs 142 and 144. In this way, fabric switch 100 supports a large number of fabric-wide virtualized networks and overcomes the limitations of IEEE 802.1Q VLANs.

It should be noted that fabric switch 100 is not the same as conventional switch stacking. In switch stacking, multiple switches are interconnected at a common location (often within the same rack), based on a particular topology (e.g., ring or linear topology). These stacked switches typically share a common address, e.g., IP address, so they can be addressed as a single switch externally. However, the switches are manually configured to join the switch stack. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, fabric switch 100 can include an arbitrary number of switches with individual addresses, can be based on an arbitrary topology (e.g., a mesh topology), and does not require extensive manual configuration. The switches can reside in the same location, or be distributed over different locations. Furthermore, a respective switch operates in conjunction with each other, without requiring any master controller. These features overcome the inherent limitations of switch stacking and make it possible to build a large "switch farm" which can be treated as a single, logical switch. Due to the automatic configuration capabilities of fabric switch 100, an individual physical switch (e.g., switch 103) can dynamically join or leave fabric switch 100 without disrupting services to the rest of the network. The automatic and dynamic configurability of fabric switch 100 allows a network operator to build its switching system in a distributed and "pay-as-you-grow" fashion without sacrificing scalability. The ability to respond to changing network conditions makes fabric switch 100 an ideal solution in a virtual computing environment, where network loads often change with time.

In some embodiments, fabric switch 100 is a Transparent Interconnection of Lots of Links (TRILL) network and a respective member switch of fabric switch 100, such as switch 103, is a TRILL routing bridge (RBridge). During operation, virtual machine 124 sends a packet to virtual machine 136. Because virtual machines 124 and 136 belong to global VLAN 142, switch 103 considers this packet to be forwarded within the same layer-2 domain. Switch 103 identifies virtual machine 136 to be coupled to switch 105 (i.e., learns the MAC address of virtual machine 136 via switch 105). Switch 103 encapsulates the packet in a TRILL header, specifies switch 105 as the egress switch, and forwards the packet to switch 105. MAC address learning and Packet forwarding in a fabric switch is specified in U.S. Patent Publication No. 2011/0268125, titled "Virtual Cluster Switching," the disclosure of which is incorporated herein in its entirety. In some embodiments, switch 103 includes the identifier of global VLAN 142 as a Virtual Private Network (VPN) identifier in the option fields of the TRILL header. Upon receiving the packet, switch 105 determines that the packet is for the local switch (i.e., switch 105) and should be forwarded in global VLAN 142, as specified in the TRILL header. Switch 105 removes the TRILL encapsulation and forwards the packet via the edge port which couples host machine 130. Hypervisor 132 in host machine 130 receives the packet and provides the packet to virtual machine 136.

Suppose that virtual machine 124, which is coupled to switch 103, migrates to host machine 130, which is coupled to switch 105, and starts running on hypervisor 132. Then the mapping for global VLAN 142 in switch 105 should support virtual machine 124. For example, switch 105's edge port 174 and VLAN 112 should be mapped to the identifier of global VLAN 142 in switch 105. If not, the IEEE 802.1Q VLAN tag mapped to the identifier of global VLAN 142 in switch 105 can be allocated to virtual machine 124 in host machine 130. In some embodiments, the service manager of switch 105 notifies hypervisor 132 to associate virtual machine 124 with the new VLAN. An error can occur if hypervisor 132 cannot configure the new VLAN for virtual machine 124. The network administrator can be notified of such potential error before virtual machine 124 migrates.

In some embodiments, a respective member switch of fabric switch 100 (e.g., switch 103) runs a control plane with automatic configuration capabilities based on Fibre Channel (FC) protocol and forms a logical Ethernet switch based on the automatic configuration capabilities of the control plane. To an external end device, such as host machine 120, fabric switch 100 appears as one, single Ethernet switch. Upon joining fabric switch 100 via the control plane, a respective member switch receives an automatically assigned identifier corresponding to the logical Ethernet switch without requiring manual configuration. However, unlike an FC fabric, the data packets in fabric switch 100 can be encapsulated and forwarded based on another forwarding protocol. Examples of this forwarding protocol include, but are not limited to, Ethernet, TRILL, and IP. These features allow switch 103 to operate in conjunction with other member switches of fabric switch 100 in a distributed way, without requiring a central controller.

In some embodiments, fabric switch 100 maintains a port profile for a respective virtual machine. A port profile represents Fibre Channel over Ethernet (FCoE) configuration, VLAN configuration, data center bridging (DCB) configuration, quality of service (QoS) configuration, and/or security configuration of one or more virtual machines. The MAC address of a virtual machine associates with the corresponding port profile to the virtual machine. The VLAN configuration in a port profile can indicate the global VLAN configuration for the virtual machine. Port profile management in a switch is specified in U.S. Patent Publication No. 2011/0299413, titled "Port profile management for virtual cluster switching," the disclosure of which is incorporated herein in its entirety.

Figure 1B:
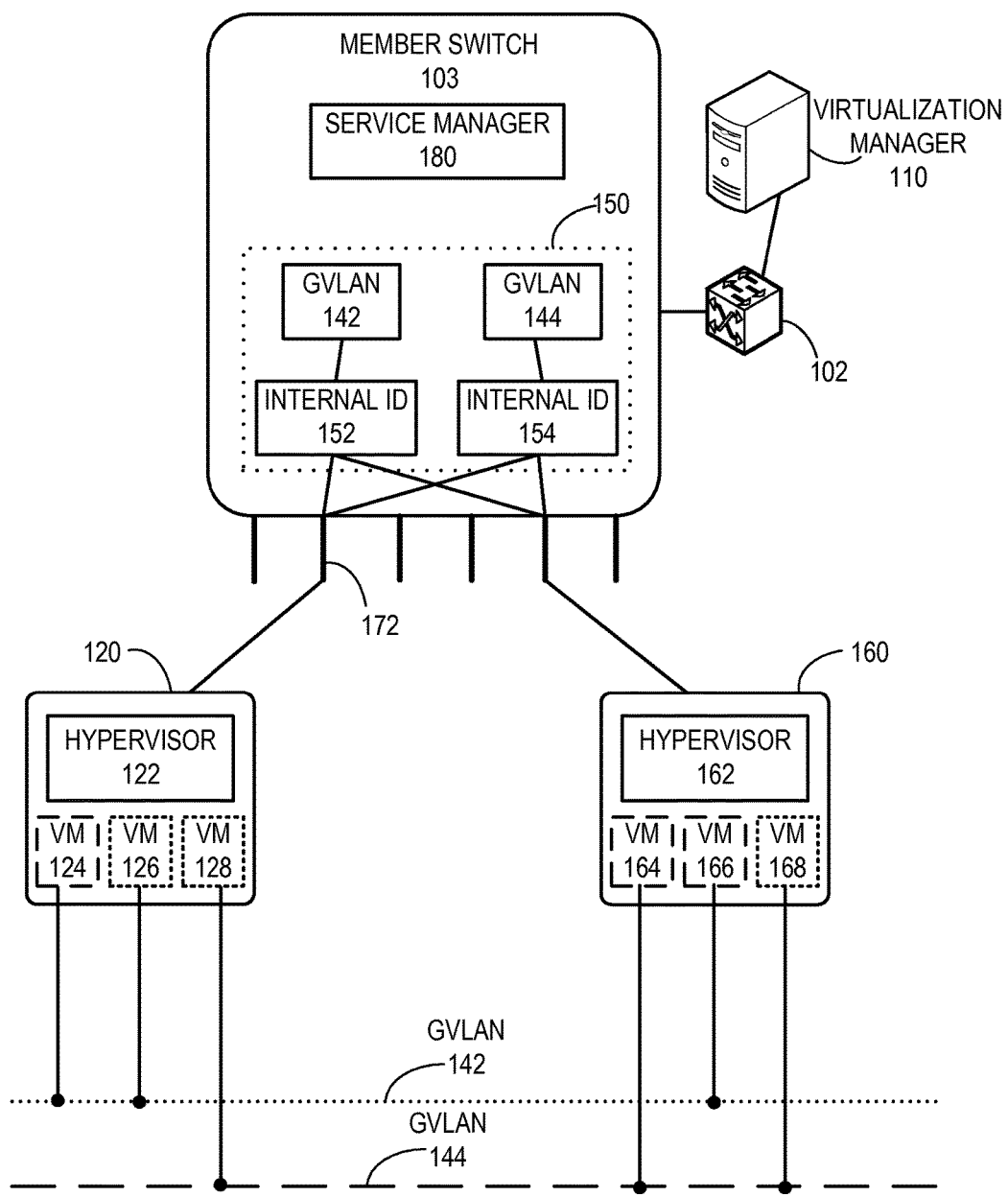
FIG. 1B illustrates an exemplary a member switch of a fabric switch with global VLAN support, in accordance with an embodiment of the present invention.

A respective member switch, such as switch 103, locally maintains global VLAN information to facilitate its fabric-wide deployment. FIG. 1B illustrates an exemplary a member switch of a fabric switch with global VLAN support, in accordance with an embodiment of the present invention. In this example, switch 103 is also coupled to a host machine 160, which includes virtual machines 164, 166, and 168 running on hypervisor 162. During operation, based on information from switch 103, virtualization manager 110 associates virtual machines 164 and 166 with VLAN 112 and virtual machine 168 with VLAN 114. Service manager 180 running on switch 103 determines that virtual machines 164 and 168 belong to the same layer-2 domain of virtual machine 128 even though their local VLANs are different. Hence, service manager 180 associates virtual machines 164 and 168 with global VLAN 144. Similarly, service manager 180 associates virtual machine 166 with global VLAN 142.

The association between a virtual machine and a global VLAN is maintained at switch 103. It should be noted that any end device outside of fabric switch 100 can be agnostic to global VLANs 142 and 144. For example, hypervisor 122 and virtual machine 128 can be agnostic to the association between global VLAN 144 and virtual machine 128. To maintain the association, switch 103 maintains a mapping 150 between global VLAN 142, and corresponding local resources and end device information of virtual machines 124 and 126. For example, switch 103 can map the MAC addresses of virtual machines 124 and 126, and port 172 to the identifier of global VLAN 142. Similarly, switch 103 can map the port and MAC address of virtual machine 128 to the identifier of global VLAN 144 in mapping 150. In this way, switch 103 localizes IEEE 802.1Q VLANs to switch 103 while maintaining a fabric-wide layer-2 virtualized network in conjunction with other member switches of fabric switch 100.

In some embodiments, global VLANs 142 and 144 can represent tenant separation. For example, virtual machines 124, 126, and 166 can belong to one tenant while virtual machines 128, 164, and 168 can belong to another tenant. Because global VLAN 142 and 144 provides the fabric-wide virtual separation for the tenants, and IEEE 802.1Q VLAN 112 and 114 are local, the full set of IEEE 802.1Q VLANs is available for deployment to a respective tenant. For example, VLANs 112 and 114 are available for deployment to both tenants. In some embodiments, a respective member switch can maintain a mapping between a tenant and one or more global VLANs associated with the tenant.

In some embodiments, switch 103 maintains two configuration tables that describe its instance: a fabric switch configuration database and a default switch configuration table. The fabric switch configuration database describes the configuration of fabric switch 100 when switch 103 is part of fabric switch 100. The default switch configuration table describes switch 103's default configuration. In some embodiments, the fabric switch configuration database includes an identifier of fabric switch 100. In one embodiment, switch 103 also maintains a switch index within fabric switch 100. This switch index is unique and persistent within fabric switch 100. That is, when switch 103 joins fabric switch 100 for the first time, fabric switch 100 assigns the switch index to switch 103. This switch index persists with switch 103, even if switch 103 leaves fabric switch 100. When switch 103 joins fabric switch 100 again at a later time, the same switch index is used by fabric switch 100 to retrieve previous configuration information for switch 103.

Internal Identifier

In the example in FIG. 1B, switch 103 maps local resources and/or end device information to a global VLAN identifier. In some embodiments, switch 103 maps the local resources and/or end device information to a local internal identifier, and maps the internal identifier to a global VLAN. In this way, switch 103 can separate the local mapping and can use this local mapping for more efficient forwarding. Mapping 150 in switch 103 can include a mapping between internal identifiers and local resources and/or end device information. For example, switch 103 can map the MAC addresses of locally coupled virtual machines 124 and 126, and port 172 to internal identifier 152. Similarly, switch 103 can maintain a mapping between the port and MAC address of virtual machine 128 and internal identifier 154. Switch 103 maps internal identifiers 152 and 154 to the identifier of global VLANs 142 and 144, respectively. Local internal identifier management and its operations in a switch are specified in U.S. Patent Publication No. 2011/0299533, titled "Internal virtual network identifier and internal policy identifier," the disclosure of which is incorporated herein in its entirety.

In some embodiments, fabric switch 100 includes one or more overlay VLANs. A gateway device can facilitate bridging between a virtual network instance (VNI) of an overlay VLAN and a global VLAN. For example, switch 103 can operate as a gateway and provide the bridging between global VLANs 142 and 144, and an overlay VNI. Switch 103 can maintain a mapping between internal identifiers 152 and 154, and corresponding overlay VNIs. Because switch 103 maps the identifiers of global VLANs 142 and 144 to internal identifiers 152 and 154, respectively, switch 103 can, in turn, obtain the association between global VLANs 142 and 144, and the corresponding overlay VNIs. It should be noted that, unlike of regular overlay VLANs, fabric switch 100 is aware of a respective source MAC address of a respective VLAN.

Figure 2:
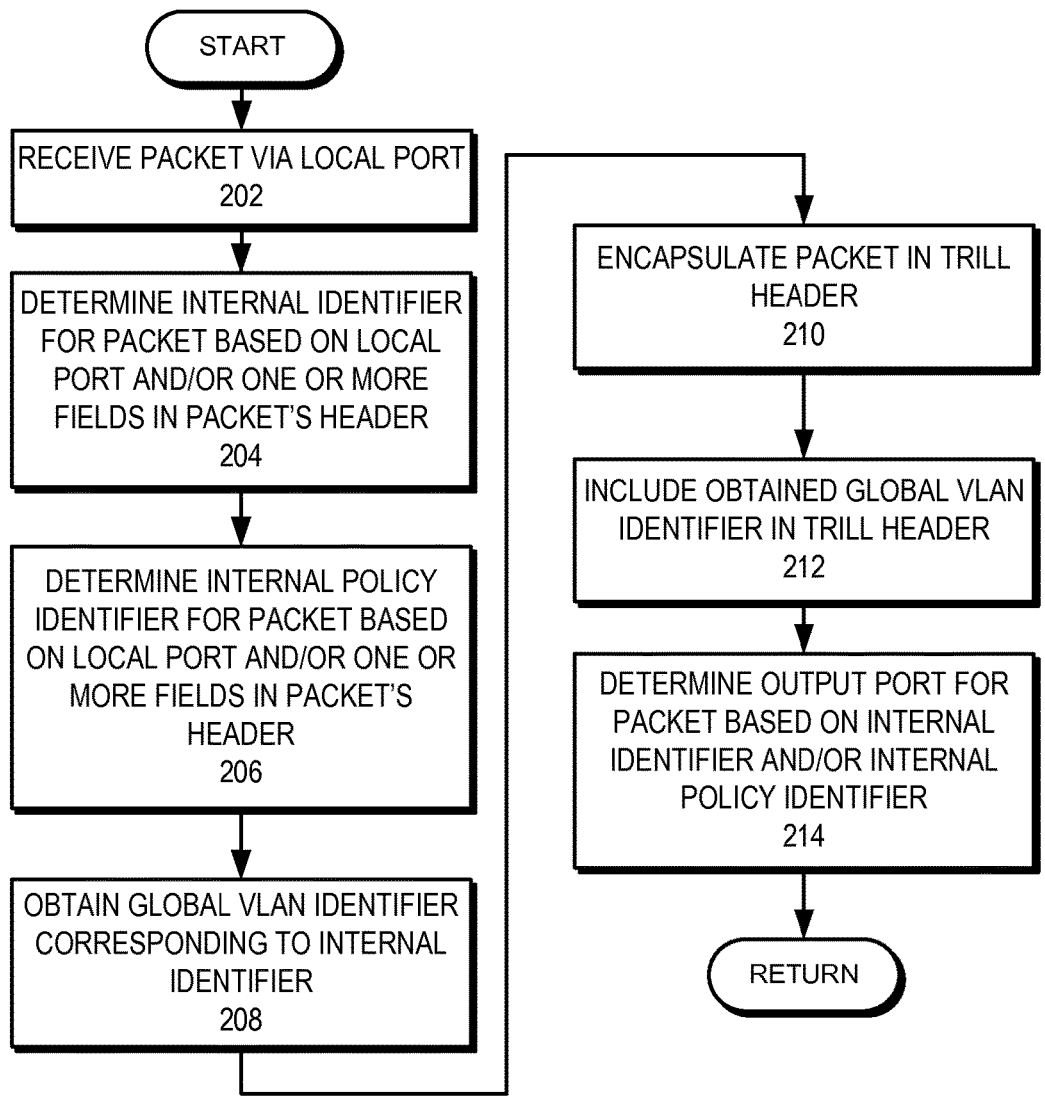
FIG. 2 presents a flowchart illustrating the process of a member switch of a fabric switch forwarding a packet based on an internal identifier and/or an internal policy identifier, in accordance with an embodiment of the present invention.

In some embodiments, switch 103 uses internal identifier to efficiently forward traffic. Switch 103 can maintain a forwarding table which indicates an output port for a corresponding internal identifier and forward a respective packet based on the forwarding table. FIG. 2 presents a flowchart illustrating the process of a member switch of a fabric switch forwarding a packet based on an internal identifier and/or an internal policy identifier, in accordance with an embodiment of the present invention. Upon receiving a packet via a local port (operation 204), the switch determines an internal identifier for the packet based on the local port and/or one or more fields in the packet's header (operation 204). Examples of the fields in the packet's header include, but are not limited to, a customer VLAN identifier, a service provider VLAN identifier, and a source MAC address.

In some embodiments, the switch also generates an internal policy identifier for the packet. This policy identifier indicates forwarding and quality of service policies for the packet. The switch determines the internal identifier for the packet based on the local port and/or one or more fields in the packet's header (operation 206). The switch can maintain a mapping between the internal identifier and/or internal policy identifier, and the port and the header fields. Upon receiving the packet, the switch can consult the mapping to determine the internal identifier and/or internal policy identifier. The switch then obtains the global VLAN identifier corresponding to the internal identifier (operation 208). The switch can consult the mapping to determine the global VLAN identifier corresponding to the internal identifier.

In some embodiments, the switch is a TRILL RBridge. The switch encapsulates the packet in a TRILL header (operation 210), as described in conjunction with FIG. 1A. It should be noted that the TRILL header includes an identifier to the egress switch, which can be an RBridge identifier. The switch includes the obtained global VLAN identifier in the TRILL header (operation 212) and determines an output port for the packet based on the internal identifier and/or internal policy identifier (operation 214). In some embodiments, the switch consults a forwarding table to determine the output port. The forwarding table can include a mapping between the internal identifier and/or internal policy identifier, and the corresponding output port.

Global VLAN

Figure 3A:
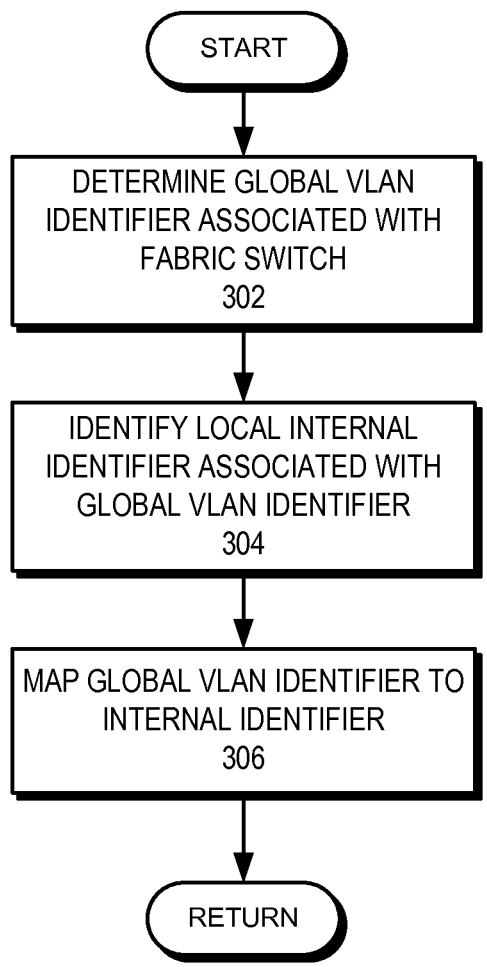
FIG. 3A presents a flowchart illustrating the process of a distributed service manager in a member switch of a fabric switch determining a global VLAN, in accordance with an embodiment of the present invention.

In the example in FIG. 1A, a distributed service manager in a respective member switch determines the global VLANs for fabric switch 100. FIG. 3A presents a flowchart illustrating the process of a distributed service manager in a member switch of a fabric switch determining a global VLAN, in accordance with an embodiment of the present invention. During operation, the service manager determines a global VLAN identifier associated with the fabric switch (operation 302). In some embodiments, the service manager determines the global VLAN identifier by receiving a mapping between a global VLAN identifier and corresponding local resources and/or end device information. In some embodiments, the service manager uses at least 20 bits to represent the global VLAN identifier. In some embodiments, the service manager identifies an internal identifier associated with the global VLAN (operation 304), as described in conjunction with FIG. 1B. The service manager maps the global VLAN identifier to the internal identifier (operation 306). Because the internal identifier corresponds to the local resources and/or end device information, mapping the global VLAN identifier to the internal identifier allows the service manager to associate the global VLAN identifier to the corresponding local resources and/or end device information.

Figure 3B:
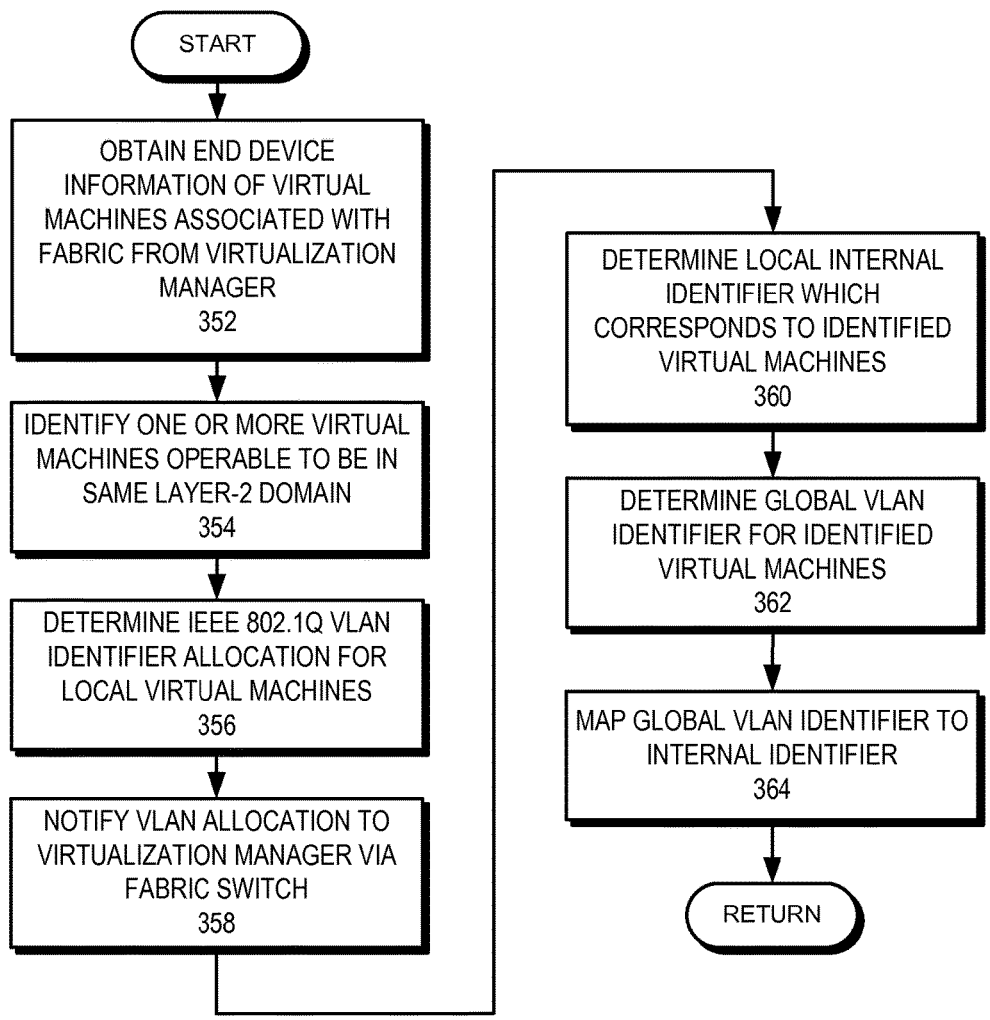
FIG. 3B presents a flowchart illustrating the process of a distributed service manager in a member switch of a fabric switch determining a global VLAN based on information from a virtualization manager, in accordance with an embodiment of the present invention.

In some further embodiments, a virtualization manager provides end device information, such as the MAC address, for a respective virtual machine associated with a fabric switch. FIG. 3B presents a flowchart illustrating the process of a distributed service manager in a member switch of a fabric switch determining a global VLAN based on information from a virtualization manager, in accordance with an embodiment of the present invention. During operation, the service manager obtains the information of virtual machines associated with the fabric switch (operation 352). The service manager then identifies one or more virtual machines operable to be in the same layer-2 domain (operation 354).

In some embodiments, the service manager determines IEEE 802.1Q VLAN allocation for the local virtual machines based on local availability and policy (operation 356), and notifies the local VLAN allocation to the virtualization manager via the fabric switch (operation 358). The service manager determines a local internal identifier which corresponds to the identified virtual machines (operation 360), as described in conjunction with FIG. 2. The service manager also determines a global VLAN identifier for the identified virtual machines (operation 362), associating the identified virtual machines with a layer-2 domain. In some embodiments, the service manager generates the corresponding global VLAN identifier based on the end device information received from the virtualization manager. The service manager then maps the global VLAN identifier to the internal identifier (operation 364), as described in conjunction with FIG. 1B.

Global VLAN Across Multiple Fabric Switches

Figure 4:
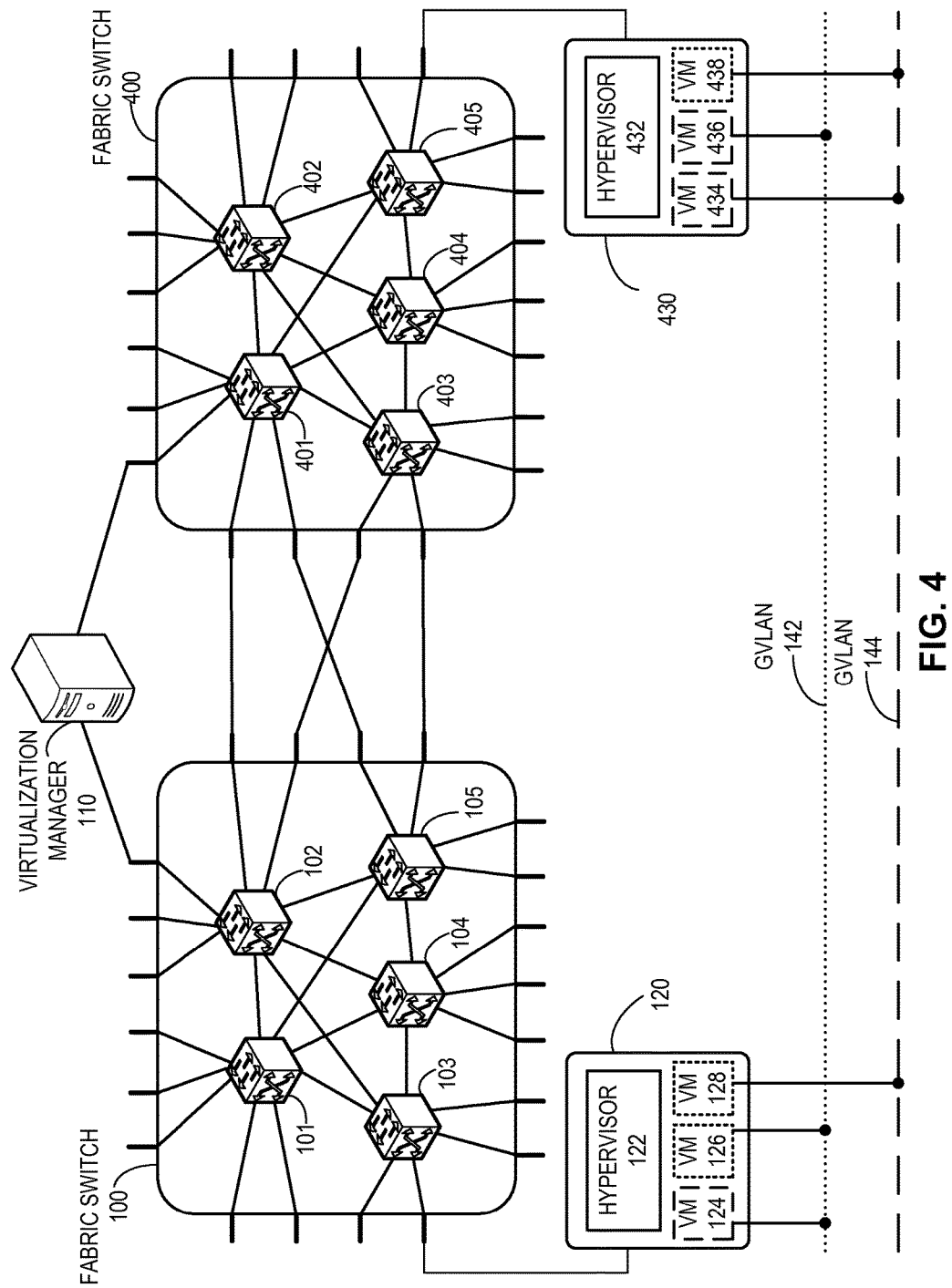
FIG. 4 illustrates exemplary global VLANs spanning a plurality of fabric switches, in accordance with an embodiment of the present invention.

In some embodiments, a global VLAN can be deployed across a plurality of fabric switches. A network operator can deploy multiple fabric switches, often within the same date center, and serve the same tenants via these multiple switches. These tenants may require virtualized layer-2 domains across a plurality of fabric switches. FIG. 4 illustrates exemplary global VLANs spanning a plurality of fabric switches, in accordance with an embodiment of the present invention. In this example, fabric switch 100 is coupled to another fabric switch 400, which includes member switches 401, 402, 403, 404, and 405. In some embodiments, one or more switches in fabric switch 400 can be a virtual switch (e.g., a software switch operating in a computing device). Switch 405 is coupled to host machine 430. Virtual machines 434, 436, and 438 run on hypervisor 432 in host machine 430. Based on IEEE 802.1Q VLAN allocation from fabric switch 400, virtual machines 434 and 436 are associated with VLAN 112 and virtual machine 438 is associated with VLAN 114, as described in conjunction with FIG. 1A.

In some embodiments, fabrics switches 100 and 400 are coupled to each other via multi-homed connections between edge ports of switches 102 and 105 in fabrics switch 100 and edge ports of switches 401 and 403 in fabric switch 400. Fabric switches 100 and 400 can also be coupled to each other via one or more tunnels. Examples of such a tunnel include, but are not limited to, Virtual Extensible Local Area Network (VXLAN), Generic Routing Encapsulation (GRE), and its variations, such as Network Virtualization using GRE (NVGRE) and openvSwitch GRE.

A respective member switch of fabric switch 400 includes a distributed service manager which manages global VLANs across fabric switch 400. During operation, the service manager of a respective member switch identifies the virtual machines belonging to a layer-2 domain based on received end device information from virtualization manager 110. For example, the service manager running on switches 103 and 405 individually determine that virtual machines 124, 126, and 436 belong to a layer-2 domain even though their local VLANs are different. Because the service manager runs in a distributed way in fabric switches 100 and 400, the service manager in both determines the same global VLAN for the virtual machines belonging to the same layer-2 domain. The distributed service manager in fabric switches 100 and 400 can generate a global VLAN identifier such a way that the same identifier is generated in a respective member switch in a respective fabric switch.

For example, the service managers in fabric switches 100 and 400 associate virtual machines 124, 126, and 436 to global VLAN 142 and represents global VLAN 142 with an identifier. Similarly, the service managers associate virtual machines 128, 134, and 438 to global VLAN 144 and represents global VLAN 144 with an identifier. It should be noted that the same identifier is allocated to global VLAN 142 (or global VLAN 144) in both fabric switches 100 and 400. In some embodiments, a respective distributed service manager in a fabric switch uses a formula to determine the global VLAN identifier.

In some embodiments, fabric switches 100 and 400 are TRILL networks and a respective member switch of fabric switches 100 and 400, such as switches 103 and 405, are TRILL RBridges. Suppose that virtual machine 124 sends a packet to virtual machine 436. Because these virtual machines belong to global VLAN 142, switch 103 considers this packet to be forwarded within the same layer-2 domain. Because virtual machine 436 is in the same layer-2 domain, switch 103 broadcasts an Address Resolution Protocol (ARP) request in global VLAN 142 to obtain the MAC address of virtual 436 and determines that virtual machine 436 is coupled via an edge port of switch 105. Switch 103 encapsulates the packet in a TRILL header and forwards the frame to switch 105, which couples fabric switch 400. In some embodiments, switch 103 includes the identifier of global VLAN 142 as a VPN identifier in the option fields of the TRILL header. Upon receiving the packet, switch 105 determines that destination virtual machine 436 is coupled via an edge port and is in global VLAN 442, as specified in the TRILL header. Switch 105 removes the TRILL encapsulation and forwards the packet via the edge port which couples switch 403 of fabric switch 400.

Because fabric switch 100 allows a tenant to use the internal IEEE 802.1Q VLAN tag, switch 105 uses double-tagging (i.e., IEEE 802.1Q in IEEE 802.1Q VLAN) for the packet while forwarding the packet to fabric switch 400. The outer service tag (S-TAG) represents the service provider's network while the inner customer tag (C-tag) represents a client's network. To represent global VLAN 142 to fabric switch 400, switch 105 uses a formula on the identifier of global VLAN 142 to determine the C-tag and S-tag for the packet. In some embodiments, switch 105 uses the formula ((identifier of global VLAN 142)/4092+1) to determine the S-tag and ((identifier of global VLAN 142) % 4092+1) to determine the C-tag.

Upon receiving the packet, switch 403 determines the identifier of global VLAN 142 from the S-tag and C-tag of the received packet and identifies virtual machine 436 to be locally coupled to switch 405 (i.e., learns the MAC address of virtual machine 436 via switch 405). Switch 403 encapsulates the packet in a TRILL header, includes an identifier of global VLAN 142 in the TRILL header, and forwards the frame to switch 405. In some embodiments, switch 403 includes the identifier of global VLAN 142 as a VPN identifier in the option fields of the TRILL header. Upon receiving the packet, switch 405 determines that the packet is for global VLAN 442, as specified in the TRILL header. Switch 405 removes the TRILL encapsulation and forwards the packet to host machine 430. Hypervisor 432 receives the packet and provides the packet to virtual machine 436.

IP Over Global VLAN

Figure 5A:
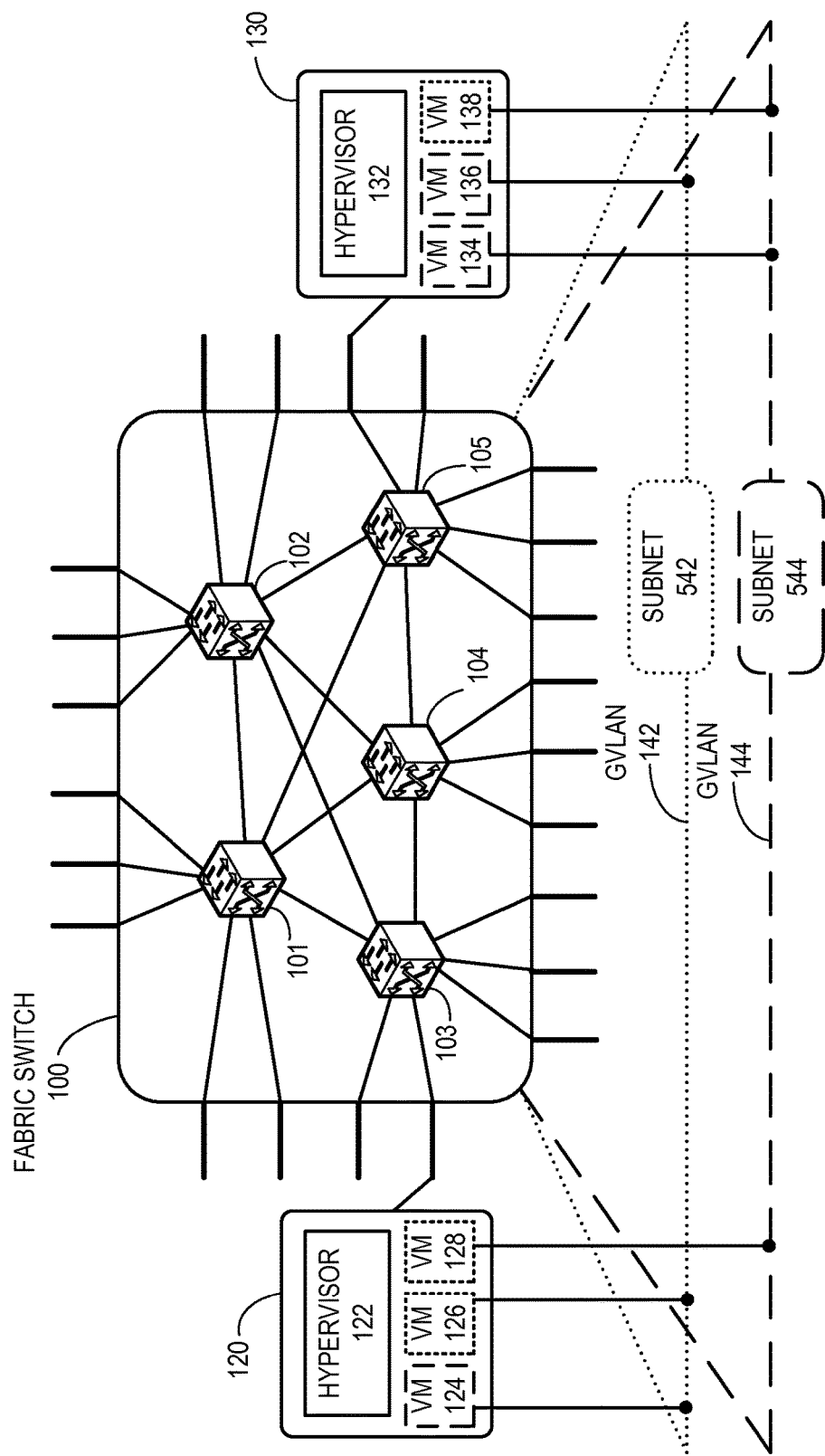
FIG. 5A illustrates an exemplary fabric switch with Internet Protocol (IP) support over global VLANs, in accordance with an embodiment of the present invention.

In some embodiments, a global VLAN can support IP routing. FIG. 5A illustrates an exemplary fabric switch with IP support over global VLANs, in accordance with an embodiment of the present invention. In this example, global VLANs 142 and 144 can support IP routing and are associated with IP subnets 542 and 544, respectively. Consequently, global VLANs 142 and 144 can operate as logical layer-3 interfaces assigned with an IP address from the corresponding subnet in a respective member switch in fabric switch 100. A respective member switch in fabric switch 100 can maintain a mapping between global VLANs 142 and 144, and corresponding subnets 542 and 544, respectively. Furthermore, virtual machines 124, 126, and 136 are assigned IP addresses from subnet 542, and virtual machines 128, 134, and 136 are assigned IP addresses from subnet 544.

In some embodiments, the corresponding layer-3 interfaces operate as default gateways for global VLANs 142 and 144. To operate as a default gateway, a respective layer-3 interface is assigned the same virtual IP address and a virtual MAC address in a respective member switch. For example, the same virtual IP address from subnet 542 is assigned to the layer-3 interface of global VLAN 142 in a respective member switch. As a result, the layer-3 interface operates as a distributed layer-3 gateway for global VLAN 142. In this way, the same virtual IP address of subnet 542 is configured as the default gateway address of virtual machines 124, 126, and 136 even though they are coupled to different member switches of fabric switch 100. Similarly, the same virtual IP address of subnet 544 is configured as the default gateway address of virtual machines 128, 134, and 136.

Because a respective member switch in fabric switch 100 maintains a mapping between the identifier of global VLAN 142 and subnet 542, the logical layer-3 interface of subnet 542 corresponds to global VLAN 142. Similarly, the logical layer-3 interface of subnet 544 corresponds to global VLAN 144. Consequently, a member switch, such as switch 103, can have a connected route between subnets 542 and 544 (i.e., switch 103 can route between subnets 542 and 544 without requiring a routing protocol).

During operation, virtual machine 124 sends a packet to virtual machine 134. Because these virtual machines belong to separate subnets (i.e., subnets 542 and 544, respectively), this packet requires routing between subnets 542 and 544. Virtual machine 124 is configured with the virtual IP address of the layer-3 interface of global VLAN 142 as the default gateway. If virtual machine 124 has not learned the corresponding virtual MAC address, virtual machine 124 sends an ARP query using the virtual IP address. Because a respective member switch in fabric switch 100 is associated with the virtual IP address, upon receiving the query, switch 103 responds with the corresponding virtual MAC address. Virtual machine 124 then forwards the packet using the virtual MAC address. Furthermore, a respective member switch in fabric switch 100 is associated with the virtual MAC address. As a result, switch 103 receives the packet, considers the layer-2 destination of the packet to be the local switch (i.e., switch 103), and promotes the packet to layer-3.

Switch 103 has logical layer-3 interfaces to both subnets 542 and 544. Consequently, switch 103 can perform connected routing between these subnets. Switch 103 determines that virtual machine 134 belongs to subnet 544, and hence, is associated with global VLAN 144. Because global VLAN 144 is local to switch 103, switch 103 can forward the packet to virtual machine 134 via global VLAN 144, as described in conjunction with FIG. 1A. If switch 103 has not learned the MAC address of virtual machine 134, switch 103 can use ARP to send a layer-2 broadcast message in global VLAN 144 for the IP address of virtual machine and obtain the MAC address of virtual machine 134.

A respective member switch in fabric switch 100 can have separate virtual routing and forwarding (VRFs) for a respective service entity (e.g., tenants, departments of the same corporation, etc.). A VRF manages routes only for a corresponding service entity. This allows the member switches to have routing separation among the service entities. In this way, a VRF provides layer-3 virtualization in the member switch. In some embodiments, such a VRF can be global and persistent in fabric switch 100. These global VRFs provide the same routing separation among the service entities in a respective member switch.

Figure 5B:
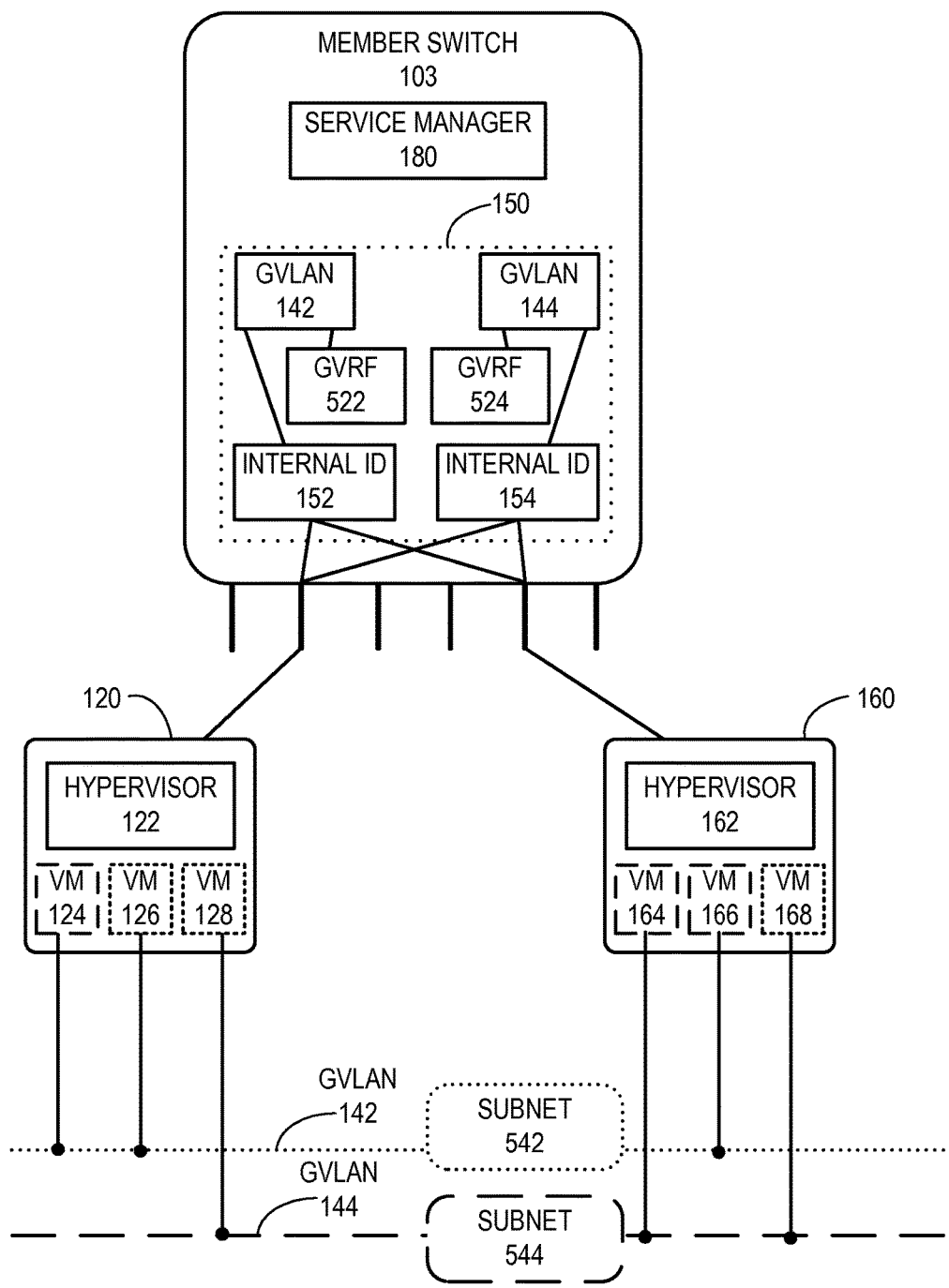
FIG. 5B illustrates an exemplary a member switch in a fabric switch with IP support over global VLANs, in accordance with an embodiment of the present invention.

FIG. 5B illustrates an exemplary a member switch in a fabric switch with IP support over global VLANs, in accordance with an embodiment of the present invention. In this example, switch 103 serves two service entities requiring logical separation and maintains two global VRFs (GVRFs) 522 and 524. Suppose that global VLANs 142 and 144 belong to the two service entities, respectively. Global VRFs 522 and 524 are then associated with global VLANs 142 and 144, respectively. Global VRFs 522 and 524 allows subnets 542 and 544 to have overlapping IP addresses. Switch 103 can include respective identifiers of global VRFs 522 and 524 in corresponding packets to distinguish between subnets 542 and 544. For example, if subnets 542 and 544 both include an IP address, the identifier of global VRF 522 or 524 along with the IP address indicates to which service entity a packet with the IP address belongs. This provides a respective service entity flexibility and layer-3 virtualization across fabric switch 100.

Figure 6:
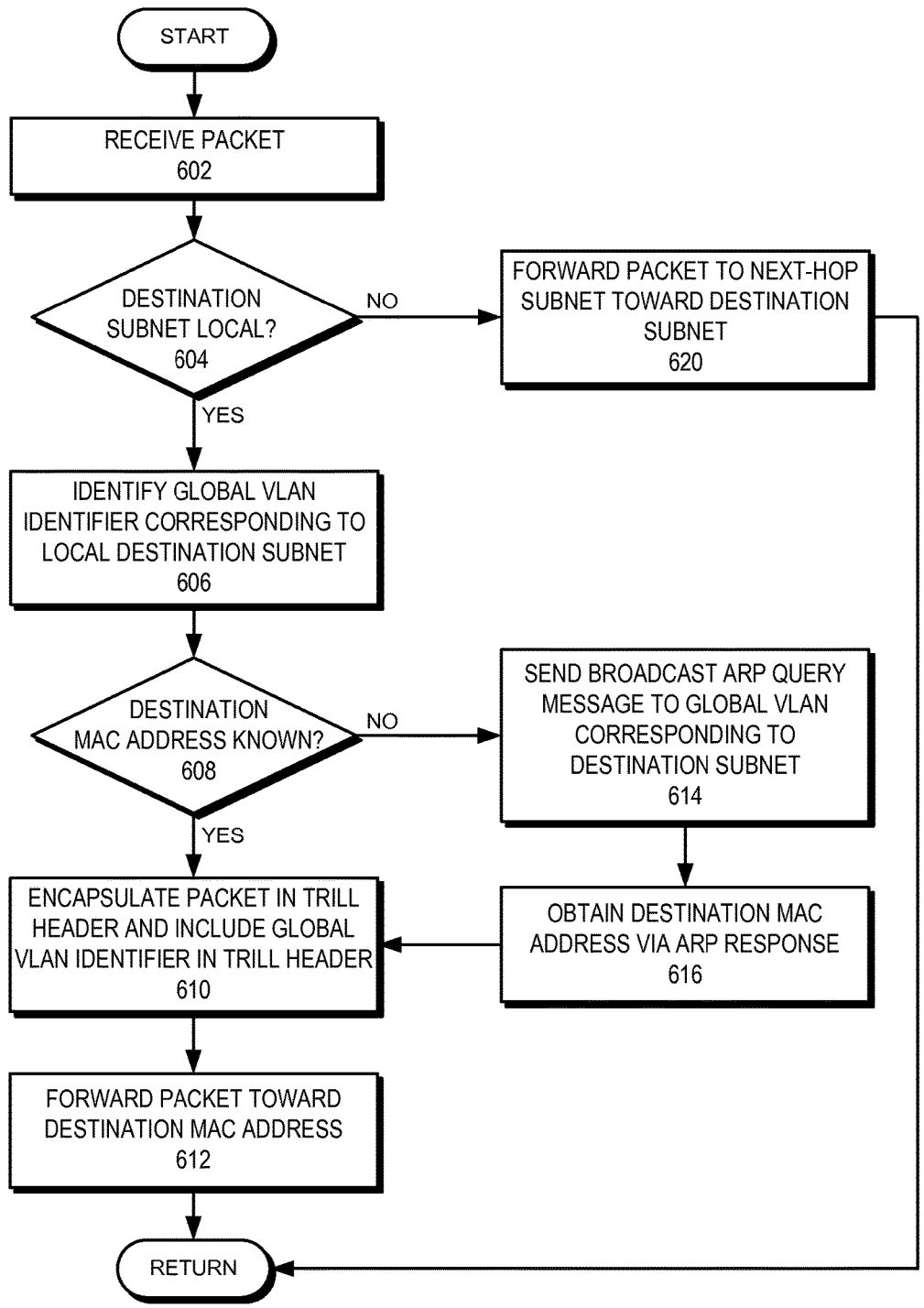
FIG. 6 presents a flowchart illustrating the process a member switch of a fabric switch forwarding a packet across subnets, in accordance with an embodiment of the present invention.

FIG. 6 presents a flowchart illustrating the process a member switch of a fabric switch forwarding a packet across subnets, in accordance with an embodiment of the present invention. Upon receiving a packet (operation 602), the switch checks whether the destination subnet is local (operation 604). In some embodiments, the switch checks whether the switch has an interface to the subnet to determine whether the destination subnet is local. If not, the switch forwards the packet to the next-hop subnet toward the destination subnet based on a local routing table (operation 620). If the destination subnet is local, the switch identifies the global VLAN identifier corresponding to the local destination subnet (operation 606).

The switch then checks whether the destination MAC address of the packet is known (operation 608). If the destination MAC address of the packet is not known, the switch sends a broadcast ARP query message to global VLAN corresponding to the destination subnet (operation 614) and obtains the destination MAC address of the packet via the ARP response of the query message (operation 616). If the destination MAC address of the packet is known (operation 608) or the switch has obtained the destination MAC address of the packet (operation 616), the switch encapsulates the packet in a TRILL header and includes the global VLAN identifier in the TRILL header (operation 610). The switch then forwards the packet toward the destination MAC address (operation 612), as described in conjunction with FIG. 1A. It should be noted that such forwarding in a global VLAN can be within or across fabric switch boundary.

Exemplary Switch

Figure 7:
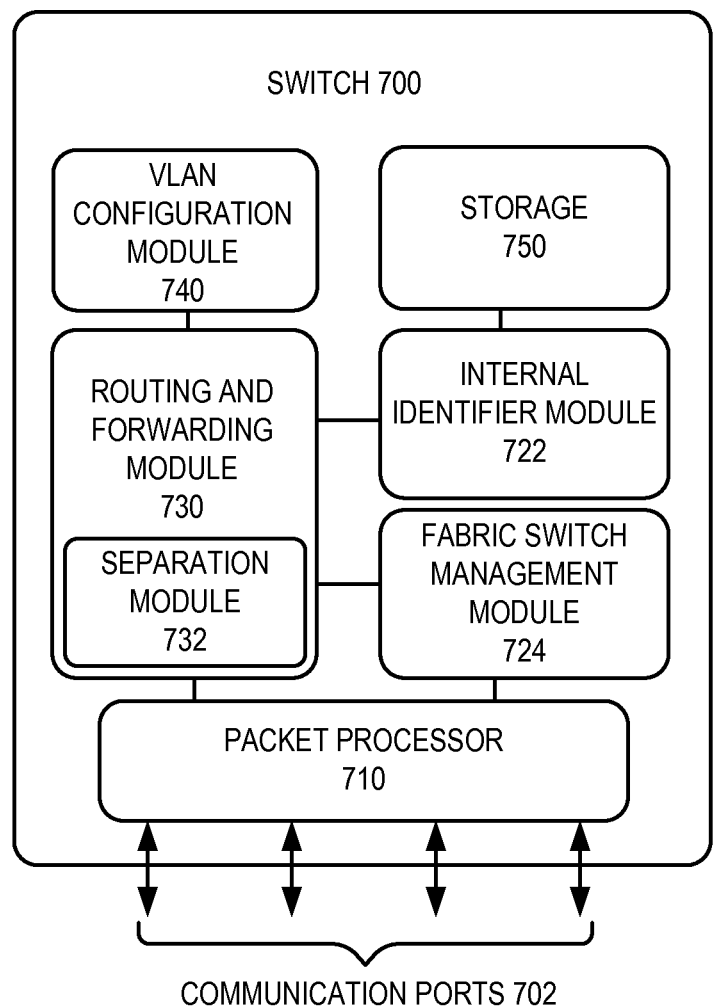
FIG. 7 illustrates an exemplary switch with global VLAN support, in accordance with an embodiment of the present invention.

FIG. 7 illustrates an exemplary switch with global VLAN support, in accordance with an embodiment of the present invention. In this example, a switch 700 includes a number of communication ports 702, a packet processor 710, a VLAN configuration module 740, and a storage 750. One or more of these modules can be included in a distributed service manager in switch 700. In some embodiments, packet processor 710 adds a TRILL header to a packet. In some embodiments, switch 700 includes a fabric switch management module 724, which maintains a membership in a fabric switch. Switch 700 maintains a configuration database in storage 750 that maintains the configuration state of a respective switch within the fabric switch. Switch 700 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format (e.g., TRILL protocol).

During operation, VLAN configuration module 740 maps local resources of the switch (e.g., one of communication ports 702) and/or locally coupled end device information to a global VLAN identifier. This mapping between the global VLAN and the local resources and/or locally coupled end device information is local to switch 700, as described in conjunction with FIG. 1A. In some embodiments, switch 700 also includes an internal identifier module 722 which determines an internal identifier based on the local resources and/or locally coupled end device information. VLAN configuration 740 module then maps the internal identifier to the global VLAN identifier, as described in conjunction with FIG. 1B.

When switch 700 receives a packet from another member switch of the fabric switch via one of communication ports 702, packet processor 710 examines the TRILL header and identifies a global VLAN identifier of the packet. However, if the packet if received from another fabric switch via one of communication ports 702, packet processor 710 examines the packet headers. Based on this examination, VLAN configuration module identifies the global VLAN identifier based on one or more fields in the packet.

In some embodiments, the global VLAN identifier in switch 700 is associated with an IP subnet with layer-3 routing support and with a logical layer-3 interface. This logical layer-3 interface is operable as a default gateway for the virtual machines locally coupled to switch 700. Under such a scenario, the logical layer-3 interface is associated with a virtual IP address and a virtual MAC address. The virtual IP address and the virtual MAC address are associated with switch 700 and other member switches of the fabric switch.

In some embodiments, switch 700 also includes a routing and forwarding module 730, which creates a route between two subnets associated with two global VLAN identifiers without requiring a routing protocol, as described in conjunction with FIGS. 5A and 5B. Routing and forwarding module 730 determines an output port for a packet from a first of the two subnets to a second of the two subnets based on the route. In some embodiments, switch 700 also includes a separation module 732, which maintains one or more virtual routing and forwarding separations, each comprising a subset of local routes. This virtual routing and forwarding separation is persistent across the fabric switch.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for providing a global VLAN across a plurality of switches. In one embodiment, the switch includes a VLAN configuration module. During operation, the VLAN configuration module maps local resources of the switch and/or locally coupled end device information to a global VLAN identifier, wherein the global VLAN is persistent across a fabric switch. The fabric switch is operable to accommodate a plurality of switches and operates as a single logical switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch configured to be a member of a network of interconnected switches, the switch comprising:
   virtual local area network (VLAN) configuration circuitry configured to:
   in response to identifying a new locally reachable end device, determine a customer VLAN for the end device based on currently allocated customer VLANs at the switch and local resources of the switch, wherein the determination of the customer VLAN is local to the switch;
   determine a layer-2 forwarding domain within the network of interconnected switches for the end device, wherein the layer-2 forwarding domain includes a plurality of customer VLANs; and
   map the customer VLAN to a global VLAN identifier identifying the layer 2 forwarding domain in the network of interconnected switches;
   wherein the global VLAN identifier is persistent across the network of interconnected switches; and
   wherein the network of interconnected switches is identified based on a fabric identifier.

2. The switch of claim 1, wherein scope of the mapping between the global VLAN and the customer VLAN is local within the switch.

3. The switch of claim 1, wherein the global VLAN is further mapped to one or more of:
   a local port associated with the end device;
   a media access control (MAC) address of the end device; and
   a Virtual Private Network (VPN) identifier; and
   wherein the customer VLAN is identified based on one or more of:
   an Institute of Electrical and Electronics Engineers (IEEE) 802.1Q Service VLAN (S-VLAN) identifier;
   an IEEE Customer VLAN (C-VLAN) identifier.

4. The switch of claim 1, further comprising:
   internal identifier circuitry configured to determine an internal identifier based on the local resources and/or information associated with the end device, wherein scope of the internal identifier is internal and local within the switch; and
   wherein the VLAN configuration circuitry is further configured to map the internal identifier to the global VLAN identifier.

5. The switch of claim 1, wherein the VLAN configuration circuitry is further configured to identify the global VLAN identifier from the mapping between the global VLAN and the customer VLAN based on one or more fields in a packet.

6. The switch of claim 1, wherein the VLAN configuration circuitry is further configured to map the global VLAN identifier further to a tenant of the switch.

7. The switch of claim 1, wherein the global VLAN identifier is associated with an Internet Protocol (IP) sub-network (subnet) with layer-3 routing support; and
   wherein the global VLAN identifier is associated with a logical layer-3 interface.

8. The switch of claim 7,
   wherein the logical layer-3 interface is associated with a virtual IP address and a virtual MAC address; and
   wherein the virtual IP address and the virtual MAC address are assigned to a respective switch in the network of interconnected switches.

9. The switch of claim 7, further comprising:
   routing circuitry configured to determine a route between a first subnet associated with a first global VLAN identifier and a second subnet associated with a second global VLAN identifier without requiring a routing protocol; and
   forwarding circuitry configured to determine an output port for a packet from the first subnet destined to the second subnet based on the route.

10. The switch of claim 7, further comprising separation circuitry configured to maintain a virtual routing and forwarding (VRF) instance comprising a subset of routes maintained by the switch, wherein the VRF instance is persistent across the network of interconnected switches.

11. The switch of claim 1, further comprising a packet processor configured to encapsulate a layer-2 frame with one or more of:
   a Transparent Interconnection of Lots of Links (TRILL) header, wherein the TRILL header includes the global VLAN identifier; and
   an IP-based encapsulation header, wherein the encapsulation header includes the global VLAN identifier.

12. The switch of claim 1, wherein the global VLAN identifier is persistent across a plurality of networks of interconnected switches.

13. A computer-executable method, comprising:
   in response to identifying a locally reachable end device from a switch, determining a customer VLAN for the end device based on currently allocated customer VLANs at the switch and local resources of the switch, wherein the determination of the customer VLAN is local to the switch, and wherein the switch is configured to be a member of a network of interconnected switches;
   determining a layer-2 forwarding domain for the end device within the network of interconnected switches for the end device, wherein the layer-2 forwarding domain includes a plurality of customer VLANs; and
   mapping the customer VLAN to a global VLAN identifier identifying the layer-2 forwarding domain in the network of interconnected switches, wherein the global VLAN identifier is persistent across the network of interconnected switches; and
   wherein the network of interconnected switches is identified based on a fabric identifier.

14. The method of claim 13, wherein scope of the mapping between the global VLAN and the customer VLAN is local within the switch.

15. The method of claim 13, wherein the global VLAN is further mapped to one or more of:
a local port, which is associated with the end device, of the switch;
a media access control (MAC) address of the end device; and
a Virtual Private Network (VPN) identifier; and
wherein the customer VLAN is identified based on one or more of:
an Institute of Electrical and Electronics Engineers (IEEE) 802.1Q Service VLAN (S-VLAN) identifier;
an IEEE Customer VLAN (C-VLAN) identifier.

16. The method of claim 13, further comprising:
determining an internal identifier based on the local resources and/or information associated with the end device, wherein scope of the internal identifier is internal and local within the switch; and
mapping the internal identifier to the global VLAN identifier.

17. The method of claim 13, further comprising identifying the global VLAN identifier from the mapping between the global VLAN and the customer VLAN based on one or more fields in a packet.

18. The method of claim 13, further comprising mapping the global VLAN identifier further to a tenant of the switch.

19. The method of claim 13, wherein the global VLAN identifier is associated with an Internet Protocol (IP) sub-network (subnet) with layer-3 routing support; and
wherein the global VLAN identifier is associated with a logical layer-3 interface.

20. The method of claim 19,
wherein the logical layer-3 interface is associated with a virtual IP address and a virtual MAC address; and
wherein the virtual IP address and the virtual MAC address are assigned to a respective switch in the network of interconnected switches.

21. The method of claim 19, further comprising:
determining a route between a first subnet associated with a first global VLAN identifier and a second subnet associated with a second global VLAN identifier without requiring a routing protocol; and
determining an output port for a packet from the first subnet destined to the second subnet based on the route.

22. The method of claim 19, further comprising maintaining a virtual routing and forwarding (VRF) instance comprising a subset of routes maintained by the switch, wherein the VRF instance is persistent across the network of interconnected switches.

23. The method of claim 13, further comprising encapsulating a layer-2 frame with one or more of:
a Transparent Interconnection of Lots of Links (TRILL) header, wherein the TRILL header includes the global VLAN identifier; and
an IP-based encapsulation header, wherein the encapsulation header includes the global VLAN identifier.

24. The method of claim 13, wherein the global VLAN identifier is persistent across a plurality of networks of interconnected switches.

25. A computing system, comprising:
a processor; and
a memory storing instructions that when executed by the processor cause the system to perform a method, the method comprising:
in response to identifying a locally reachable end device from a switch, determining a customer VLAN for the end device based on currently allocated customer VLANs at the switch and local resources of the switch, wherein the determination of the customer VLAN is local to the switch, and wherein the switch is configured to be a member of a network of interconnected switches;
determining a layer-2 forwarding domain for the end device within the network of interconnected switches for the end device, wherein the layer-2 forwarding domain includes a plurality of customer VLANs; and
mapping the customer VLAN to a global VLAN identifier identifying the layer-2 forwarding domain in the network of interconnected switches, wherein the global VLAN identifier is persistent across the network of interconnected switches; and
wherein the network of interconnected switches is identified based on a fabric identifier.

26. The computing system of claim 25, wherein scope of the mapping between the global VLAN and the customer VLAN is local within the switch.

27. The computing system of claim 25, wherein the global VLAN is further mapped to one or more of:
a local port, which is associated with the end device, of the switch;
a media access control (MAC) address of the end device; and
a Virtual Private Network (VPN) identifier; and
wherein the customer VLAN is identified based on one or more of:
an Institute of Electrical and Electronics Engineers (IEEE) 802.1Q Service VLAN (S-VLAN) identifier;
an IEEE Customer VLAN (C-VLAN) identifier.

28. The computing system of claim 25, wherein the method further comprises:
determining an internal identifier based on the local resources and/or information associated with the end device, wherein scope of the internal identifier is internal and local within the switch; and
mapping the internal identifier to the global VLAN identifier.

29. The computing system of claim 25, wherein the method further comprises identifying the global VLAN identifier from the mapping between the global VLAN and the customer VLAN based on one or more fields in a packet.

30. The computing system of claim 25, wherein the method further comprises mapping the global VLAN identifier further to a tenant of the switch.

31. The computing system of claim 25, wherein the global VLAN identifier is associated with an Internet Protocol (IP) sub-network (subnet) with layer-3 routing support; and
wherein the global VLAN identifier is associated with a logical layer-3 interface.

32. The computing system of claim 31,
wherein the logical layer-3 interface is associated with a virtual IP address and a virtual MAC address; and
wherein the virtual IP address and the virtual MAC address are associated with a respective switch in the network of interconnected switches.

33. The computing system of claim 31, wherein the method further comprises:
determining a route between a first subnet associated with a first global VLAN identifier and a second subnet associated with a second global VLAN identifier without requiring a routing protocol; and determining an output port for a packet from the first subnet destined to the second subnet based on the route.

34. The computing system of claim 31, wherein the method further comprises maintaining a virtual routing and forwarding (VRF) instance comprising a subset of routes maintained by the switch, wherein the VRF instance is persistent across the network of interconnected switches.

35. The computing system of claim 25, wherein the method further comprises encapsulating a layer-2 frame with one or more of:
 a Transparent Interconnection of Lots of Links (TRILL) header, wherein the TRILL header includes the global VLAN identifier; and
 an IP-based encapsulation header, wherein the encapsulation header includes the global VLAN identifier.

36. The computing system of claim 25, wherein the global VLAN identifier is persistent across a plurality of networks of interconnected switches.

\* \* \* \* \*